Patented Jan. 14, 1936

2,027,991

UNITED STATES PATENT OFFICE 2,027,991

ESTERS OF ETHERIFIED GLYCOLLIC ACIDS

Wolfgang Lübbert and Ernst Ludwig Müller, Dusseldorf, Germany, assignors to Henkel & Cie. G. m. b. H., Dusseldorf, Germany No Drawing. Application November 29, 1932, Serial No. 644,911. In Germany December 5, 1931

7 Claims. (Cl. 260—103)

The present invention relates to a process for the manufacture of esters of aliphatic or hydroaromatic hydroxy- or mercapto-compounds, the said esters being substituted in the acid radical.

Such organic compounds may be obtained if hydroxy- or mercapto-fatty acids which are alkylated, cycloalkylated, aralkylated or arylated at the oxygen or sulphur or their derivatives or substitution products, are esterified with aliphatic or hydroaromatic compounds which contain at least one hydroxyl or mercapto group, and at least 6 carbon atoms.

In place of the said fatty acid derivatives, their substitution products may also be employed. As such come into consideration for example, radicals of the type specified substituted by halogen groups, hydroxy groups, sulphonic acid groups, carboxyl groups, hydrocarbon radicals or basic radicals and the like.

As fatty acid radicals, the known fatty acids with normal or branched chain may be employed.

As aliphatic or hydroaromatic compounds containing hydroxy groups, alcohols having straight or branched carbon chains may be employed, such as, for example, the products formed by the hydrogenation of fatty acids, naphthenic acids, resin acids, the oxidation of paraffins, the decomposition of wax-like substances, the hydrogenation of phenols and the like. The corresponding mercapto compounds may likewise be employed. Also polyvalent alcohols or mercaptans may also be employed with the same success for the synthesis of compounds of the class referred to above.

The compounds containing hydroxyl groups or mercapto groups may be of a saturated or unsaturated nature.

The said compounds, which contain hydroxyl or mercapto groups, may in their turn contain substituents of all kinds, such as carboxyl groups or their derivatives, halogens, ether groups, sulphonic acid groups and the like.

The esterification of the components is effected in known manner with the free acids, if desired in the presence of catalysts. Derivatives of the fatty acids obtained by modifying the carboxy-group, such as chlorides, anhydrides, salts may be employed, or the principle of alcoholysis may be applied.

Also instead of the hydroxy compounds, their reactive derivatives, such as mineral acid esters, or ester salts or alcoholates may be employed.

The new compounds possess to some extent emulsifying properties. They may be employed, for example, in the perfume industry or as softening agents or the like. Provided they possess groups which render them soluble in water, they have saponaceous properties. Furthermore they serve as starting substances for other conversion products.

Examples

1. In 186 parts by weight of dodecanol-1 are dissolved in approximately the same volume of carbon tetrachloride. Into this mixture, 170 parts by weight of phenoxy-acetyl chloride are allowed to run in drops at the ordinary temperature with stirring. The reaction, which takes place at once with heating, is assisted by gently heating to about 70° C., when hydrochloric acid escapes in streams. After the reaction is completed, the carbon tetrachloride is distilled off with or without a vacuum. The ester remaining behind solidifies at once when placed in cold water to form a colorless, wax-like mass. It melts at 31° C.

The new compound possesses a faint, pleasant odor.

2. To 200 grams of octodecanol, dissolved in the same quantity of carbon tetrachloride, is added in drops with stirring, at about 40° C., 126 grams of phenoxy-acetyl chloride. The reaction, which sets in quickly, is completed in from 2 to 3 hours by heating to boiling point. After evaporating off the carbon tetrachloride, the ester formed is poured into ice-water and the latter is quickly sucked off from the rapidly solidifying wax-like mass. When recrystallized from spirit, the ester has a melting point of 55° C.

Like dodecanol and octodecanol, hexadecanol, tetradecanol and octanol, and mixtures of these alcohols are esterified by means of phenoxy-acetyl chloride. The esters of the higher alcohols form wax-like masses. The octyl phenoxy-acetic ester is liquid. The hexadecyl phenoxyacetic ester melts at about 47° C. (uncorrected). The corresponding tetradecyl phenoxyacetic ester has a melting point of 39° C. (uncorrected).

3. 50 grams of oleyl alcohol dissolved in 60 cc. of carbon tetrachloride is heated with 32 grams of phenoxy-acetyl chloride to 75° C., with stirring, until the evolution of hydrochloric acid ceases. After evaporation of the solvent, the ester thus obtained, which is in the form of a syrupy, almost colorless oil, may be employed for further reactions.

4. 400 grams of the alcohol mixture obtained by the hydrogenation of coconut fatty acids is heated to 100° C. with 304 grams of phenoxyacetic acid in a current of hydrochloric acid gas or in a current of nitrogen with catalysts, such as boric acid, $ZnCl_2$, or the like. With gradual increase in the temperature to 150° C., the esterification is completed within 5 hours. The ester mixture obtained constitutes a slightly brownish oil.

5. Into a solution of 100 grams of cyclohexanol in 300 cc. of carbon tetrachloride, there is gradually introduced with stirring at 60° C., 170 grams of phenoxy-acetyl chloride. Thereupon, the mixture is heated for 1½ hours at boiling temperature until the evolution of hydrochloric acid gas has ceased. After expelling the carbon tetrachloride, the ester may be distilled in a vacuum. It constitutes a colorless oil. Boiling point is 176 to 178° C. at 7 mm. pressure.

Instead of the phenoxyacetic acid, it is also possible to employ in the preceding example nuclear substituted phenoxyacetic acids, such as for example 2-carboxy-phenoxy-acetic acid, mono- or polychlorphenoxyacetic acids, mono- or disulpho phenoxyacetic acid and the like, furthermore naphthoxyacetic acids, ethoxyacetic acid, ethyl-thioglycollic acid, phenylthioglycollic acid and the like compounds which are substituted at an oxygen or sulphur atom or contain unsubstituted alkyl, aryl, aralkyl or hydroaryl radicals.

6. 111 grams of paraffin alcohols (acetyl number: 212) is heated with 76 grams of phenoxyacetic acid in a current of hydrochloric acid gas for 6 hours at 120° C., whereupon the phenoxyacetic acid has completely disappeared and a syrupy ester-mixture is formed.

If 170 grams of phenoxyacetyl chloride is allowed to act upon a solution of 222 grams of paraffin alcohols in 500 cc. of carbon tetrachloride with stirring at 75° C. for two hours, the same syrupy mixture of the esters is likewise obtained, likewise with a quantitative yield, after evaporation of the solvent.

7. A mixture of equal parts of thiodiglycollic acid ($COOHCH_2SCH_2COOH$) and dodecyl alcohol is heated in a current of nitrogen for 10 to 15 hours. At the same time, the temperature is gradually raised from 120° C. to 170° C. The reaction mixture is put on ice, neutralized with soda and the sodium salt of the dodecyl (carboxymethyl-mercapto-acetic) ester is precipitated with common salt. It is a white, pasty mass. The aqueous solutions of the salts have good foam-producing properties.

8. 100 parts of thiodiglycollic acid is heated in a similar manner as in Example 7 with 80 parts of n-octyl alcohol, if desired in the presence of esterification catalysts, for about 15 hours from 80° C. to about 150° C. in a gentle current of nitrogen, the higher temperatures being maintained for a short time only. The reaction mixture is then neutralized with soda and carefully evaporated on a water bath. In this way, the sodium salt of the mono-octyl ester of thiodiglycollic acid is obtained in the form of a paste.

9. 60 parts of thiodiglycollic acid is heated in a similar manner as in Example 7 with 90 parts of oleyl alcohol, if desired in the presence of esterification catalysts, for about 12 hours to from 140° to 200° C. in a gentle current of nitrogen with stirring, the higher temperatures being maintained for a short time only. The ester formed constitutes a brown oil solidifying in the cold. After the addition of soda it dissolves in water with a slight cloudiness. The solution has good foam-producing properties.

10. 95 parts by weight of dodecyl alcohol is heated with 54 parts by weight of the lactone of hydroxyethoxyacetic acid in a current of nitrogen, with good stirring, for about 6 hours to from 150° to 160° C. A very good yield of the dodecyl (hydroxy-ethoxy)-acetic ester is obtained. The ester tends to decompose on heating.

11. 80 parts by weight of n-octyl alcohol is heated with 65 parts of the lactone of hydroxyethoxyacetic acid with good stirring for about 6 to 7 hours to 180° C., a gentle current of nitrogen being finally passed through. The octyl (hydroxy-ethoxy)-acetic ester is obtained in the form of a perfectly homogeneous oleaginous mass.

12. 110 parts by weight of octodecyl alcohol is converted with 42 parts by weight of the lactone mentioned in Example 11 in 7 hours at 160° to 180° C. The octodecyl (hydroxy-ethoxy)-acetic ester formed has a wax-like consistency.

13. 120 parts by weight of the alcohols (mean molecular weight 200) corresponding to the coconut oil fatty acids is converted as in Example 10 with 61.2 parts of the lactone of hydroxyethoxyacetic acid at 125° to 175° C. in 9 hours.

We claim:

1. The esters having the general formula $R^1XCH_2COOR^2$ where X signifies a divalent non-metallic atom of the group consisting of oxygen and sulphur, $R^1$ represents a member selected from the group consisting of the hydroxyethyl-radical, the phenyl-radical and the carboxy-methyl-radical, and $R^2$ signifies an alkyl radical having at least 6 carbon atoms.

2. The esters set forth in claim 1, wherein X is oxygen.

3. The esters set forth in claim 1, wherein X is sulphur.

4. The esters set forth in claim 1, wherein $R^2$ signifies an alkyl radical of an alcohol which is formed by the carboxylic hydrogenation of a fatty acid contained in fatty oils.

5. The ester having the formula $C_6H_5OCH_2$-COO-alk, where alk signifies an alkyl radical, containing at least 8 and no more than 18 carbon atoms.

6. The ester having the formula $HOC_2H_4OCH_2$-COO-alk, where alk signifies an alkyl radical, containing at least 8 and no more than 18 carbon atoms.

7. The ester having the formula $HOCOCH_2$-$SCH_2COO$-alk, where the alk signifies an alkyl radical, containing at least 8 and no more than 18 carbon atoms.

WOLFGANG LÜBBERT.
ERNST LUDWIG MÜLLER.